No. 697,209. Patented Apr. 8, 1902.
B. KOPPENHAGEN.
DEVICE FOR FACILITATING TAKING PILLS.
(Application filed July 24, 1901.)
(No Model.)
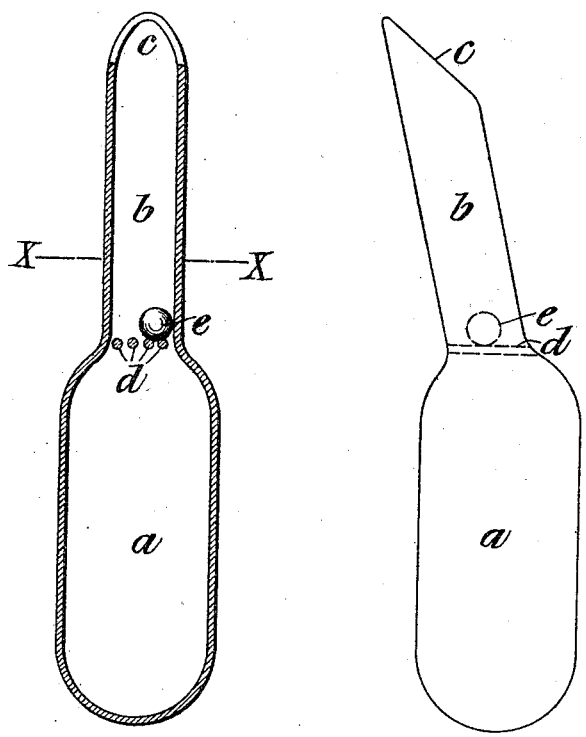
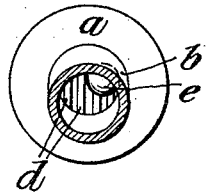
Witnesses:
Max Mayer.
Max Rensch.
Inventor
Benno Koppenhagen
per F. A. Hoppen
Attorney

UNITED STATES PATENT OFFICE.

BENNO KOPPENHAGEN, OF UNTERNEUBRUNN, GERMANY.

DEVICE FOR FACILITATING TAKING PILLS.

SPECIFICATION forming part of Letters Patent No. 697,209, dated April 8, 1902.

Application filed July 24, 1901. Serial No. 69,561. (No model.)

*To all whom it may concern:*

Be it known that I, BENNO KOPPENHAGEN, physician, a subject of the King of Bavaria, residing at Unterneubrunn, in the Duchy of Saxe-Meiningen, in the Empire of Germany, have invented certain new and useful Improvements in Devices for Facilitating the Taking of Medical Pills, of which the following is a specification.

It is a known fact that many persons are completely unable to take a pill without chewing it more or less prior to swallowing it down. The reason for this behavior lies in the fact that the tongue, owing to a stimulus or an excitement or irritation of the nerves, presses itself closely against the palate as soon as the pill has been placed or has arrived upon it. All exertions to swallow the pill are then in vain in spite of the most energetical chewing and gorging movements, so that there remains for the respective person nothing else but to take the pill between the teeth and chew it, whereafter the pill mass can be swallowed. The aforementioned drawback may now easily be overcome by means of the improved device forming the subject-matter of this invention. The construction and manner of use of this device are very simple, and it places the physician in the position to prescribe pills in a more extended manner than was hitherto possible, which is advantageous for the sick and desirable for the physician, because this latter can make use of a very exact dosage of the medicaments.

In order to make my invention more clear, I refer to the accompanying drawings, in which similar letters denote similar parts throughout the several views, and in which—

Figure 1 is a longitudinal section of my improved device. Fig. 2 is a side view, and Fig. 3 is a cross-section in line *x x* of Fig. 1.

The device, which is preferably made of transparent glass, consists of a vessel *a*, having the shape of a cylinder with rounded-off ends. One end of this vessel is provided with an opening affording access to a tube-like elongation *b* of said vessel. There is, however, arranged in said opening a kind of grate *d*, formed by glass rods, and the free end *c* of the pipe or tube *b* is cut obliquely away, as shown. In using the device this latter is held so as to have the oblique end of the pipe *b* at the top, and the vessel *a* is then filled up to about half its height with a suitable liquor. Thereupon the pill *e* is placed upon the glass grate *d*, and the thus-prepared device is taken into the mouth in such a manner that the end of the pipe *b* can be pressed down upon the tongue, the opening of said end being, however, directed upward, so as to remain free. When then the vessel *a* is quickly raised and the end of the pipe *b* is pressed down upon the tongue, during that time there forms a pretty large gap behind the the tongue, so that the liquor suddenly flowing down takes the pill with it, which then is swallowed without any difficulty whatever. Owing to the construction and manner of action of the device the pill is entirely prevented from coming in contact with the teeth and the fore part of the mouth, so that the problem of enabling a person to swallow a pill without the least inconvenience may indeed be regarded as satisfactorily solved.

Having now described my invention, what I desire to secure by a patent of the United States is—

As a means for facilitating the taking of medical pills the combination with a small vessel adapted to receive such a quantity of liquor as suffices to wash down a medical pill, of a pipe forming a longitudinal extension of said vessel and a grate located at the inner end of said pipe and being adapted to support the pill to be washed down by the liquor contained in the said vessel; the said pipe being located obliquely with regard to the vessel and its free end being obliquely cut away in the same direction of inclination so as to be adapted to form a gap behind the tongue when pressed down upon the inner end of the latter, substantially as described and shown.

In witness whereof I have hereunto set my hand in presence of two witnesses.

BENNO KOPPENHAGEN.

Witnesses:
ERNEST GUMPERT,
MAX SCHUSTER.